June 19, 1934. S. MOREIRA 1,963,062
WELDING DIE
Filed Jan. 28, 1933  2 Sheets-Sheet 1
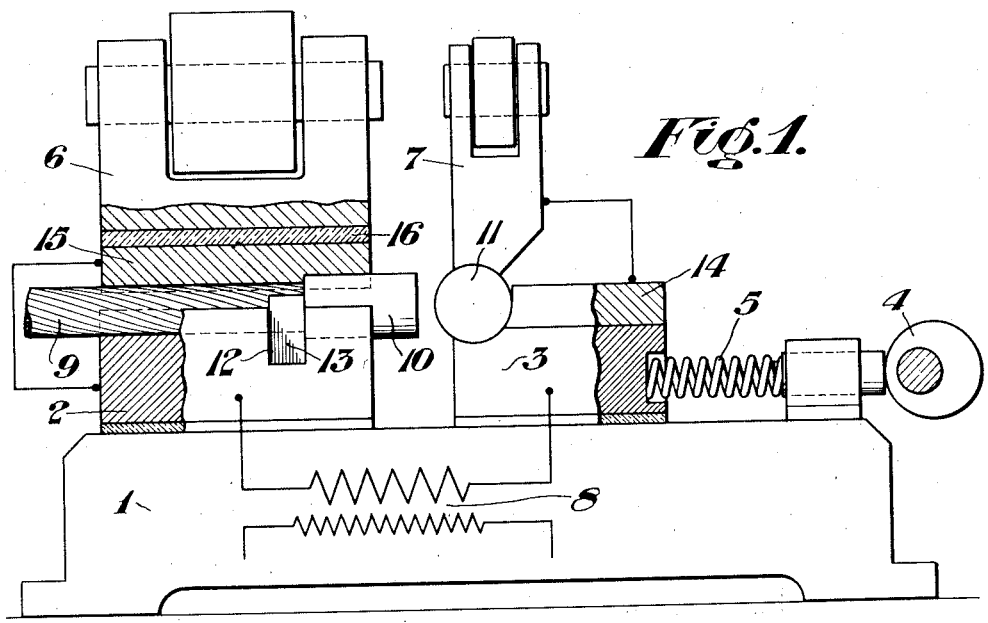
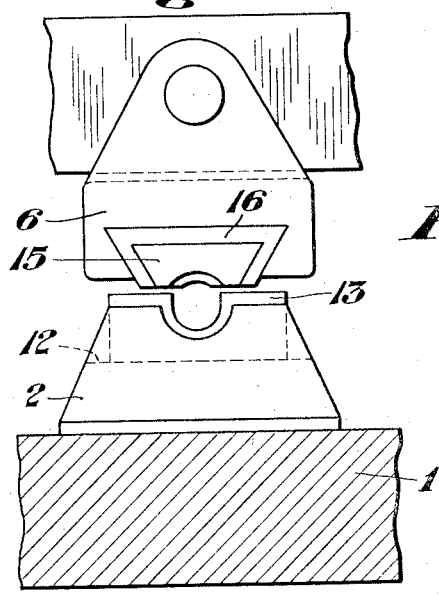
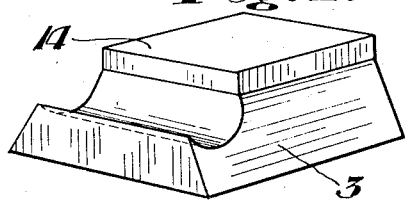
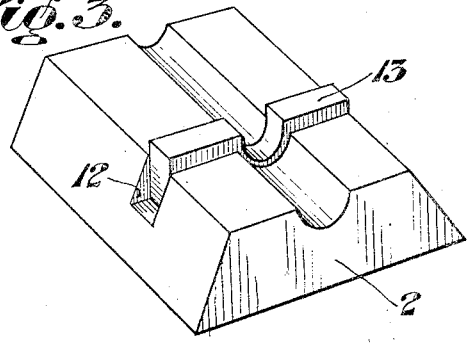
Inventor:
SALVADOR MOREIRA,
by: Usina Haeuber
his Attorneys.

June 19, 1934.  S. MOREIRA  1,963,062
WELDING DIE
Filed Jan. 28, 1933   2 Sheets-Sheet 2

Inventor:
SALVADOR MOREIRA,
by: Usina Hauber
his Attorneys.

Patented June 19, 1934

1,963,062

UNITED STATES PATENT OFFICE 1,963,062

WELDING DIE

Salvador Moreira, Worcester, Mass., assignor to The American Steel and Wire Company of New Jersey, a corporation of New Jersey Application January 28, 1933, Serial No. 654,044

1 Claim. (Cl. 219—4)

This invention relates to electric welding dies, one of the objects being to improve their construction so that heavy pressures may be transmitted therethrough to the work being welded. Other objects may be inferred from the following disclosure.

Referring to the drawings:

Figure 1 is a partially cross-sectional side elevation of a welding machine using the dies.

Figure 2 is an end elevation of Figure 1.

Figures 3 and 4 are details from Figure 1.

Figure 5:
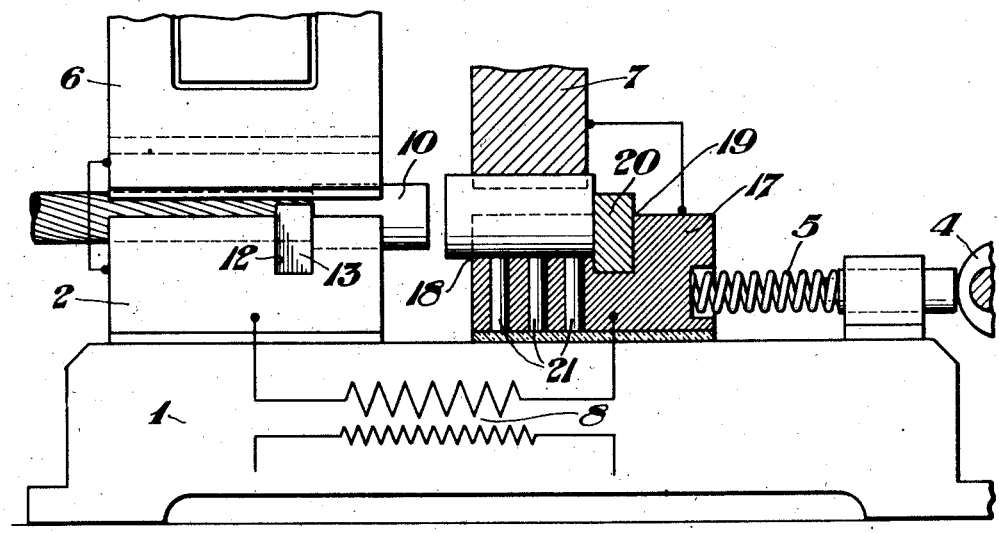
Figure 5 is similar to Figure 1 except that a different form of die is used.
Figure 6:
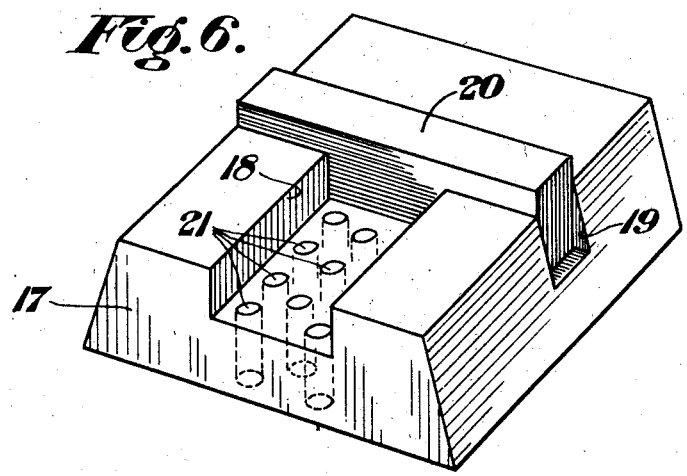
Figure 6 is an enlarged detail from Figure 5.

A base 1 mounts a fixed die 2 and a movable die 3. The movable die is operated by a suitably powered eccentric 4 through a connecting spring 5. Fixed and movable dies 6 and 7 are suspended above the fixed and movable dies 2 and 3. Because of the diagrammatic character of the drawings no mechanism is shown for supporting the dies 6 and 7, but it is to be understood that they may be respectively clamped against the dies 2 and 3. The die 7 moves with a die 3 during the welding operation and both the dies 6 and 7 are electrically connected with their associated dies through their mounting mechanism. The dies 2 and 3 may be powered with welding currents by a suitably constructed transformer 8 which may be carried by the base 1. Direct current may be used if desired.

The above machine is intended to apply very heavy pressures to bring the two pieces of work together during welding. This is accomplished by rotation of the eccentric 4. The various dies may be made from copper, other metals or alloys of metals.

As metals of high conductivity are generally relatively soft, it has been found impossible to apply pressures which practice has indicated desirable. That is to say, the dies not only rapidly wear but their work-holding surfaces are actually torn away if the desired pressures are applied therethrough.

In the present instance the die 2 is provided with a cylindrical depression for the reception of a strand 9 of a rail bond. This strand is provided with an end sleeve 10 and is to be right angularly welded to a terminal 11. This die is also provided with a slot or recess 12 which right angularly intercepts its strand-carrying depression. A metallic element 13 is inserted in this slot 12 and is yoke-shaped to form a shoulder in the die's receiving depression. This element is shaped to receive the strand 9 so that its end sleeve 10 bears thereagainst. If desired, the die strand-carrying depression may depart slightly from a true cylindrical section, it assuming this latter shape as it wears. The part of the element through which the strand passes may be made a true cylindrical section, as it will wear but slightly.

When a die of the above character is used the desired pressures may be transmitted therethrough without fear of damage. The element 13 transmits work forging or welding pressures from a large area of the die 2 to the edge of the sleeve 10 of the strand 9. The body transmits the welding currents to the work and a small portion of the pressure, while the majority of the pressure is transmitted through the hard element 13.

The die 3 operates upon a similar principle. Its work carrying depression is at right angles to the one of the die 2. The hard pressure-transmitting element consists of a piece 14 attached to the conducting body 3 so its edge engages the terminal 11. The effect secured is substantially the same as described in connection with the fixed die 2.

The die 6 which clamps the work to the die 2 carries a hard element 15, the two being dovetailed together. In this form the pressure-transmitting element might possibly receive a sufficient amount of the welding currents to overheat it. Suitable electrical insulation 16 is therefore interposed between it and its carrying guide. This also avoids arcing between the die and the work.

It is to be understood that the major portion of the welding currents is carried by the dies 2 and 3, the dies 6 and 7 being only incidentally connected thereto due to the machine's construction. However, should it be found that the pressure-transmitting elements of these first dies are becoming overheated it might prove desirable to insulate them from their carrying, current conducting bodies in some suitable manner.

The die 7 will not be specifically described, because it may be constructed along the lines already described.

In case the terminal 11 is to be welded to the end of the strand 9 in alinement, another form of die might be used. This consists of a conductive body 17 having a work carrying depression 18 intercepted by a right angular groove 19. The groove 19 carries a hard metal, pressure-transmitting element 20 which operates as already described. The bottom of the depression 18 may be reenforced by inserted hard metallic plugs 21 which bear against the work and prevent rapid wearing of the body 17.

When the foregoing disclosure is taken as a whole it will be seen that the invention primarily consists in the provision of a welding die having a body constructed and arranged to hold the work and conduct welding currents therethrough, while one or more wear resisting elements or portions are incorporated with this body for the purpose of transmitting heavy welding pressures to the work.

The specific examples shown and described are in accordance with the patent statutes and not for the purpose of limiting the invention's scope exactly thereto, except as defined by the following claim.

I claim:

A welding die having a recess shaped to receive a part to be welded, said die being provided with an insert constructed from harder material than any other metal from which said die can be constructed and still possess the requisite electrical conductivity, and said insert being associated with said die for right angular engagement with said part so as to transmit forging pressures between the latter and a sufficient area of said die to prevent tearing or deformation of the latter.

SALVADOR MOREIRA.